US 11,506,285 B2

(12) United States Patent
Schaer et al.

(10) Patent No.: US 11,506,285 B2
(45) Date of Patent: Nov. 22, 2022

(54) PISTON AND CYLINDER OF AN INTERNAL COMBUSTION ENGINE

(71) Applicant: MAN Energy Solutions SE, Augsburg (DE)

(72) Inventors: Talat Schaer, Augsburg (DE); Ulf Waldenmaier, Dasing (DE)

(73) Assignee: MAN ENERGY SOLUTIONS SE, Augsburg (DE)

( * ) Notice: Subject to any disclaimer, the term of this patent is extended or adjusted under 35 U.S.C. 154(b) by 0 days.

(21) Appl. No.: 17/293,784

(22) PCT Filed: Sep. 19, 2019

(86) PCT No.: PCT/EP2019/075169
§ 371 (c)(1),
(2) Date: May 13, 2021

(87) PCT Pub. No.: WO2020/099001
PCT Pub. Date: May 22, 2020

(65) Prior Publication Data
US 2022/0003315 A1 Jan. 6, 2022

(30) Foreign Application Priority Data
Nov. 14, 2018 (DE) ............ 10 2018 128 564.7

(51) Int. Cl.
*F16J 1/08* (2006.01)
*F02F 3/00* (2006.01)
*F16J 9/12* (2006.01)

(52) U.S. Cl.
CPC ............... *F16J 1/08* (2013.01); *F02F 3/0015* (2013.01); *F16J 9/12* (2013.01)

(58) Field of Classification Search
CPC ........ F16J 9/203; F16J 1/08; F16J 1/09; F02F 3/22; F02F 3/20; F02F 3/027
See application file for complete search history.

(56) References Cited

U.S. PATENT DOCUMENTS 1,767,164 A 6/1930 James et al.
10,260,452 B2 * 4/2019 Linke .................. F02F 3/22

FOREIGN PATENT DOCUMENTS

AT 208657 4/1960
DE 884586 7/1953
(Continued)

OTHER PUBLICATIONS

International Search Report issued in corresponding PCT Application PCT/EP2019/075169.
(Continued)

*Primary Examiner* — Abiy Teka
(74) *Attorney, Agent, or Firm* — Cozen O'Connor

(57) ABSTRACT

A piston of a cylinder of an internal combustion engine includes: a piston skirt; a grooved ring belt on a first axial side of the piston skirt, the ring belt grooves being limited by, and separated from one another by, ring lands, the ring grooves for receiving a piston ring; and an oil collection channel between the piston skirt and the ring belt. The oil collection channel has a greater depth than in the circumferential position of a coupling side of the piston and/or in the circumferential position of a coupling opposite side of the piston. The oil collection channel has a gradient, the gradient emanating from an axial depth in a region of the coupling side and/or of the coupling opposite side in the direction of the axial depth in the region of the pressure side and/or of the pressure opposite side.

11 Claims, 4 Drawing Sheets

(56) References Cited

FOREIGN PATENT DOCUMENTS

| | | | | |
|---|---|---|---|---|
| DE | 967095 | | 10/1957 | |
| DE | 4007992 A | * | 9/1990 | ............. F02F 3/003 |
| DE | 4221240 A1 | * | 1/1994 | ............ F02F 3/0069 |
| DE | 10 2017 213 896 | | 2/2019 | |
| DE | 102018216513 A1 | * | 3/2020 | |
| EP | 1077322 A1 | * | 2/2001 | ............... F01M 1/08 |
| JP | S 54-47937 | | 4/1979 | |
| JP | H0564567 | | 8/1993 | |

OTHER PUBLICATIONS

Office Action dated Feb. 9, 2022 issued in India Patent Application No. 202147021428.
Office Action dated Aug. 22, 2022 issued in Japanese Patent Application No. 2021-526330.

* cited by examiner

PISTON AND CYLINDER OF AN INTERNAL COMBUSTION ENGINE

CROSS REFERENCE TO RELATED APPLICATIONS

This is a U.S. national stage of International application No. PCT/EP2019/075169, filed on Sep. 19, 2019, which claims priority to German Application No. 10 2018 128 564.7 filed Nov. 14, 2018, the content of each of which is incorporated herein by reference.

BACKGROUND OF THE INVENTION

1. Field of the Invention

The invention relates to a piston of an internal combustion engine. The invention, furthermore, relates to a cylinder of an internal combustion engine.

2. Description of the Related Art

A cylinder of an internal combustion engine comprises a piston, which is moveably guided up and down in a cylinder liner. The fundamental construction of a piston, which via a connecting rod is coupled to a crankshaft of the internal combustion engine is familiar to the person skilled in the art addressed here. Accordingly, a piston comprises a piston skirt through which a piston pin for attaching the piston to the respective connecting rod extends. On a side of the piston skirt, a ring belt of the piston is positioned, wherein the ring assembly of the piston comprises multiple ring grooves limited by ring lands and separated from one another by the ring lands for receiving piston rings.

Seen in the circumferential direction of the piston, the piston has defined circumferential positions, namely a so-called pressure side and a so-called pressure opposite side. During the movement of the piston in the cylinder liner, the piston is pressed via the gas pressure near a top dead center against a cylinder wall of the cylinder liner, wherein this circumferential position is referred to as pressure side. On the side located diametrically opposite, the so-called pressure opposite side is formed. A straight line can be drawn through the pressure side and pressure opposite side, wherein a straight line running perpendicularly to the straight line extends parallel to the piston pin, which connects the piston to the respective connecting rod. On this straight line, which extends parallel to the piston pin, a so-called coupling side and a so-called coupling opposite side of the piston is located, which is located diametrically opposite the coupling side.

DE 884 586 B discloses a piston of an internal combustion engine in monobloc design. Here, piston skirt and ring belt are embodied integrally in a monolithic assembly. Between the piston skirt and the ring belt an oil collection channel is formed according to this prior art seen in the axial direction, in which scraped-off oil can be collected. Seen in the axial direction, this oil collection channel has an axial depth that is constant in the circumferential direction and a width that is constant seen in the radial direction.

By way of the piston lateral forces acting on the piston during the operation, the piston is pressed against the cylinder liner with great force in the region of the top dead center, i.e., in the region of the pressure side of the piston. In particular when for the lubrication or cooling of the piston insufficient oil is present, a metallic contact between the piston and the cylinder liner can occur, as a result of which so-called seizures can be caused. This can damage the cylinder. There is a need for a piston or a cylinder of an internal combustion engine having a piston with which the risk of damage is reduced.

SUMMARY OF THE INVENTION

Starting out from this, it is an object of the invention to create a new type of piston and cylinder of an internal combustion engine. This object may be achieved through a piston of an internal combustion engine. According to an aspect of the invention, the oil collection channel in the circumferential position of the pressure side of the piston and/or in the circumferential position of the pressure opposite side of the piston seen in the axial direction of the piston has a greater depth than in the circumferential position of the coupling side of the piston and/or in the circumferential position of the coupling opposite side of the piston. Furthermore, the oil collection channel seen in the circumferential direction of the piston has a gradient, namely originating from the axial depth in the region of the coupling side and/or of the coupling opposite side in the direction of the axial depth in the region of the pressure side and/or of the pressure opposite side.

By way of the oil collection channel configured according to an aspect of the invention with different depths defined in the axial direction on the pressure opposite side, the pressure side, the coupling side and/or the coupling opposite side, oil can be collected during a downward stroke of the piston approximately from the middle of the downward movement of the piston in the direction of the bottom dead center, namely in the region of the coupling side and coupling opposite side of the oil collection channel. Because of the gradient in the oil collection channel, this accumulated oil flows in the direction of the pressure side and preferentially pressure opposite side of the piston, wherein this collected oil, during an upward movement of the piston from the middle of the upward movement up to the top dead center, is then splashed through inertia forces in the direction of the ring belt of the piston and the cylinder liner where it is then available for the lubrication. Accordingly, the cylinder is supplied with lubricating oil in the region of its top dead center in the region of the pressure side and preferentially pressure opposite side so that the risk of a so-called seizure is reduced. Accordingly, the risk of damage to the piston is reduced.

Preferentially, the axial depth of the oil collection channel in the circumferential position of the pressure side and preferentially in the circumferential position of the pressure opposite side amounts to between 4 mm and 30 mm, preferably between 6 mm and 20 mm. The axial depth of the oil collection channel in the circumferential position of the coupling opposite side and preferentially in the circumferential position of the coupling side, which is always smaller than the axial depth in the circumferential position of the pressure side and preferentially pressure opposite side amounts to between 2 mm and 15 mm, preferably between 3 mm and 10 mm. Such a dimensioning of the oil collection channel is particularly preferred in order to collect oil during the downward movement of the piston in the region of the oil collection channel and dispense it again in the region of the upward movement.

Preferentially, a control edge facing the oil collection channel is formed, seen in the axial direction of the piston, between the oil collection channel and the ring belt, which includes an angle with the axial direction. By virtue of the control edge, the collecting of the oil and dispensing of the oil can be specifically influenced.

Preferentially, the angle included with the axial direction by the control edge changes in the circumferential direction of the piston. As a result of this, individual angles can then be adjusted in the region of the pressure opposite side, the pressure side, the coupling side and/or the coupling opposite side in order to individually influence the collecting of the oil and dispensing of the oil.

BRIEF DESCRIPTION OF THE DRAWINGS

Preferred further developments of the invention are obtained from the following description. Exemplary embodiments of the invention are explained in more detail by way of the drawings without being restricted to this. There it shows.

DETAILED DESCRIPTION OF THE PRESENTLY PREFERRED EMBODIMENTS

Figure 1:
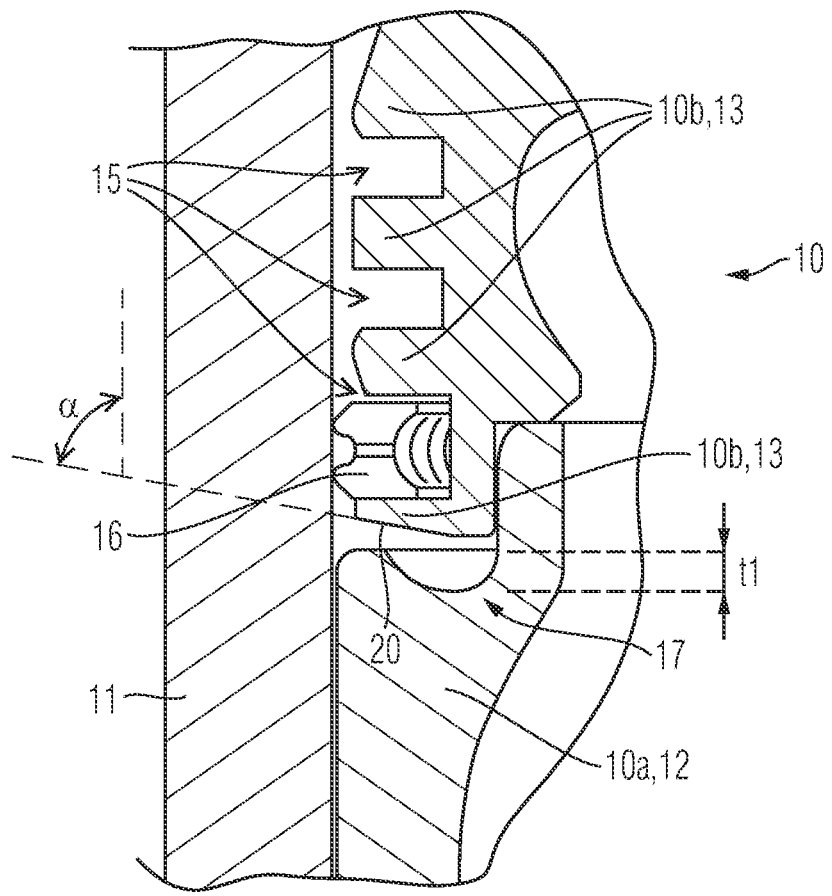
FIG. 1 a cross section by way of an extract through a piston according to an aspect of the invention in a sectional direction extending through the coupling side and the coupling opposite side with a built embodiment of the piston.

The invention relates to a piston of a cylinder of an internal combustion engine and to a cylinder of an internal combustion engine having a piston.

FIGS. 1 to 6 show different cross sections and details of a piston 10 of a cylinder of an internal combustion engine according to an aspect of the invention, which is moveably guided up and down in a liner 11. The piston 10 of the exemplary embodiment of FIGS. 1 to 6 is a so-called built piston consisting of two piston portions 10a and 10b, which are formed as separate assemblies 10a and 10b and joined to one another.

The piston 10 of the exemplary embodiment of FIGS. 1 to 6 has a piston skirt 12, which is provided by the assembly 10a of the piston. A piston pin, which is not shown, for connecting the piston 10 to a connecting rod of the respective cylinder, which is not shown, extends through the piston skirt 12.

The piston 10, furthermore, comprises a ring belt 13 which is provided by the assembly 10b of the piston 10. The ring belt 13 is arranged on an axial side of the piston skirt 12 located opposite the connecting rod.

The ring belt 13 comprises multiple ring grooves 15 that are limited by ring lands 14 and spaced from one another by the ring lands 14. In the ring grooves 15, piston rings 16 are arranged which are either formed as a compression ring or as an oil scraper ring. Such a piston ring 16 is shown for the piston 10 of FIGS. 1 to 6.

The piston comprises an oil collection channel 17. The oil collection channel 17 is formed, seen in the axial direction of the piston 10, between the piston skirt 12 and the ring belt 13, i.e., positioned, seen in the axial direction, between the piston skirt 12 and the ring belt 13.

In the circumferential direction of the piston 10, the oil collection channel 17 circulates about the piston 10 and in the shown exemplary embodiment is formed by the assembly 10a of the piston 10.

Figure 2:
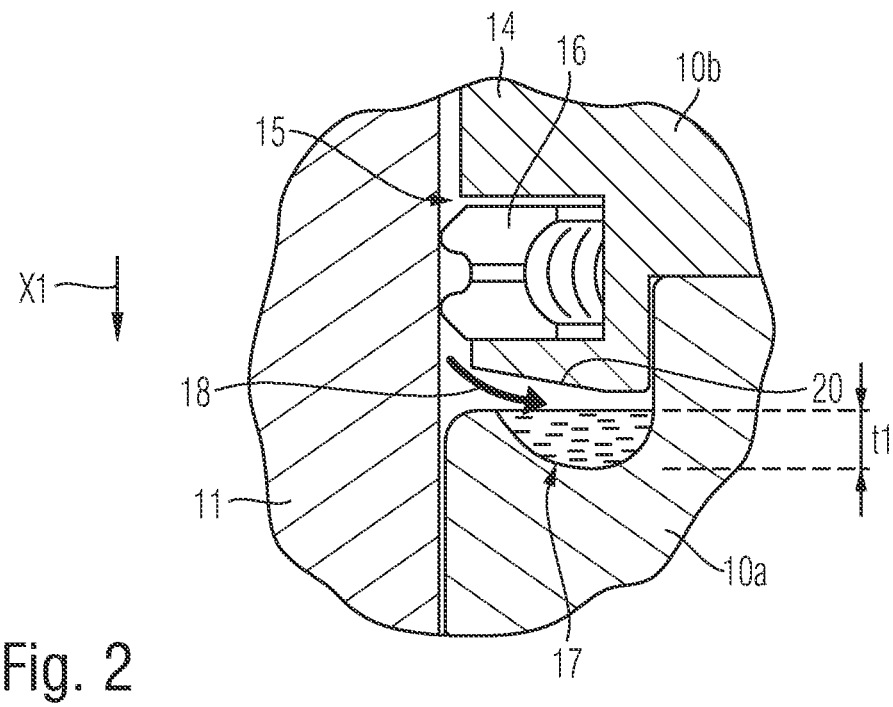
FIG. 2 an extract from FIG. 1 during the downward stroke of the piston.
Figure 3:
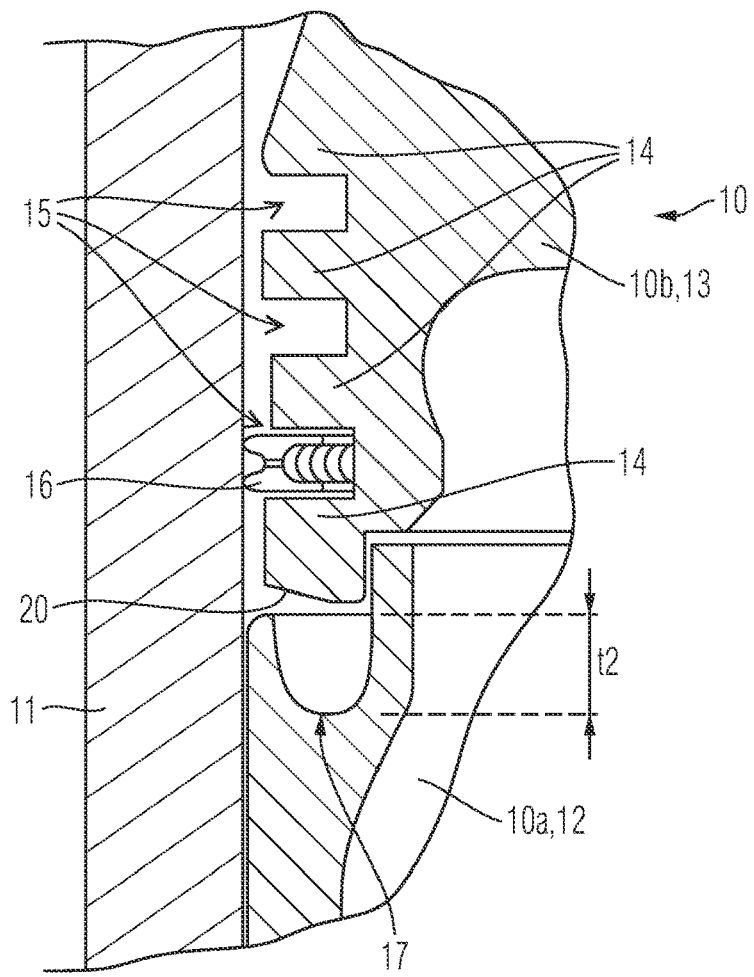
FIG. 3 a cross section by way of an extract through the piston according to FIGS. 1 and 2 in a sectional direction extending through the pressure side and the pressure opposite side.
Figure 4:
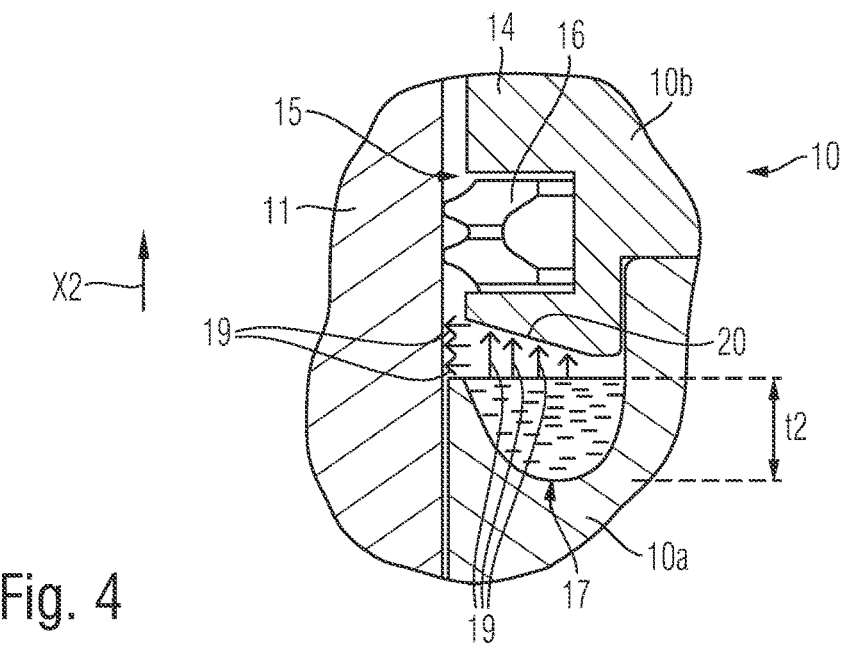
FIG. 4 an extract from FIG. 3 during the upward stroke of the piston.

As is evident from a comparison of FIGS. 1, 2 with FIGS. 3, 4, the axial depth t of this oil collection channel 17 seen in the circumferential direction is not constant, the oil collection channel 17, seen in the axial direction of the piston 10, rather has a greater axial depth t2 in the circumferential position of the pressure side of the piston 10 and preferentially also in the circumferential position of the pressure opposite side of the piston (see FIGS. 3 and 4) than the piston has a depth t1 in the circumferential position of the coupling side of the same and in the circumferential position of the coupling opposite side of the same (see FIGS. 1, 2).

As already explained, the coupling side and the coupling opposite side of the piston lie on a straight line which extends parallel to the axis of the piston pin. The pressure side and pressure opposite side of the piston 10 lie on a straight line, which extends perpendicularly to the piston pin.

Figure 5:
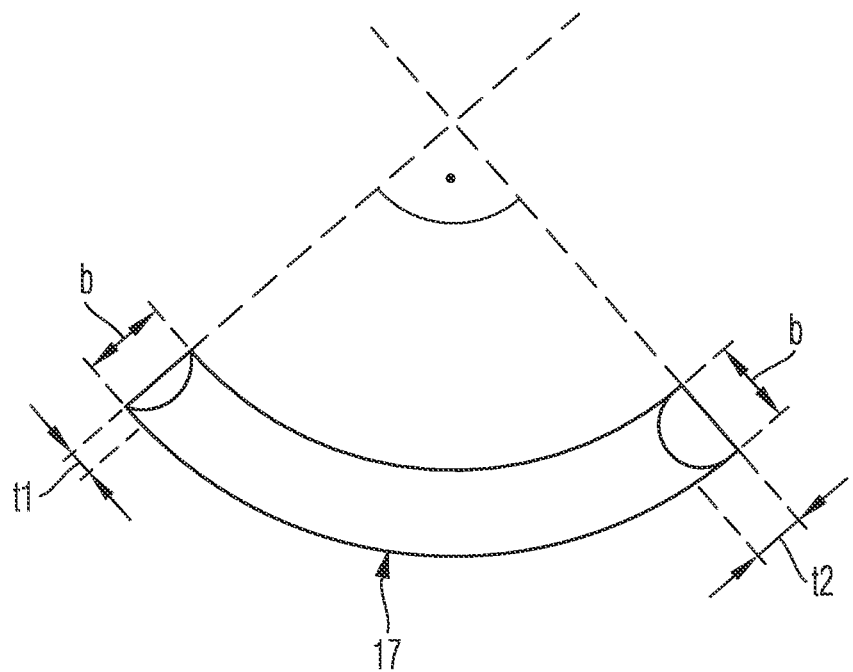
FIG. 5 a detail of the piston.
Figure 6:
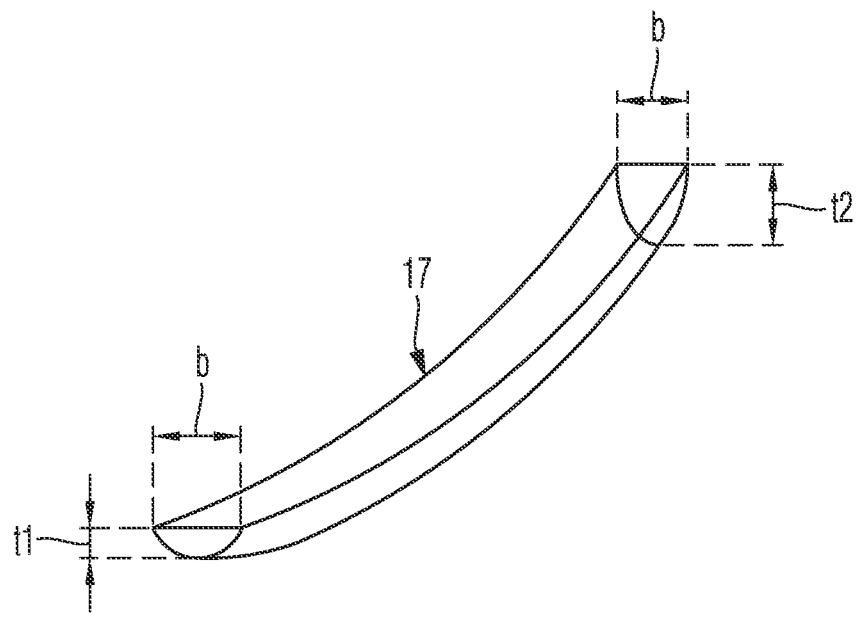
FIG. 6 a further detail of the piston.

The 90° offset between the relatively low depth t1 of the oil collection channel 17 in the circumferential position of the coupling side and in the circumferential position of the coupling opposite side to the relatively large depth t2 of the oil collection channel 17 in the circumferential position of the pressure side and in the circumferential position of the pressure opposite side is also evident from FIG. 5.

While the axial depth t of the oil collection channel 17 changes in the circumferential direction of the piston, the radial width b of the oil collection channel 17 is preferentially constant in the circumferential direction.

The oil collection channel 17 not only has the different depths on the pressure side, the pressure opposite side and the coupling side, the coupling opposite side, but the oil collection channel 17 also has a gradient namely emanating from the relatively low axial depth t1 in the region of the coupling side and counter-coupling side in the direction of the relatively large axial depth t2 in the region of the pressure side and the pressure opposite side. In this manner it can be ensured that oil, which is accumulated in the region of the coupling side and the counter-coupling side in the region of the oil collection channel 17, can drain in the direction of the pressure side and pressure opposite side of the piston 10 or the oil collection channel 17 and collect there.

FIG. 2 shows a detail of the piston 10 during a downward movement of the piston 10, i.e., during a downward stroke (arrow X1), emanating from the top dead center in the direction of the bottom dead center, wherein approximately from the middle of this downward movement to the bottom dead center, oil in the region of the coupling side and counter-coupling side is collected and enters the oil collection channel 17. An arrow 18 illustrates this oil collecting during the downward movement of the piston 10 from the middle of the downward movement to the bottom dead center.

As already explained, the oil, emanating from the coupling side and coupling opposite side, flows as a consequence of the gradient of the oil collection channel 17 in the oil collection channel 17 in the direction of the pressure side and pressure opposite side. The gradient of the oil collection channel 17, emanating from the coupling side and coupling opposite side in the direction of the pressure side and pressure opposite side is preferentially continuous, i.e., without steps or shoulders.

FIG. 4 illustrates a detail of the oil collection channel 17 in the region of the pressure side during an upward stroke (arrow X2) of the piston 10, i.e., during a movement of the same emanating from the bottom dead center into the region of the top dead center, wherein approximately from the middle of this upward stroke up to the top dead center according to the arrows 19 of FIG. 4, oil from the oil collection channel 17 in the region of the pressure side and pressure opposite side is directed in the direction of the cylinder liner 11.

In this manner, an optimum lubrication of the piston in the region of the top dead center can be realized even in the presence of major coupling lateral forces, so that a metallic contact between piston 10 and liner 11 can be avoided and the risk of a piston seizure reduced or eliminated.

As already explained, the axial depth t2 of the oil collection channel 17 in the region of the pressure side and pressure opposite side of the piston 10 is greater than the axial depth t1 of the oil collection channel 17 in the region of the coupling side and coupling opposite side of the piston 10. In the circumferential position of the coupling side and coupling opposite side of the piston 10, the axial depth t1 of the oil collection channel 17 preferably amounts to between 2 mm and 15 mm, particularly preferably between 3 mm and 10 mm. The axial depth t2 of the oil collection channel in the circumferential position of the pressure side and the pressure opposite side, which is greater than the axial depth t1, preferably amounts to between 4 mm and 30 mm, particularly preferably between 6 mm and 20 mm. The width b in the radial direction of the oil collection channel 17 preferably amounts to between 2 mm and 25 mm, particularly preferably between 5 mm and 20 mm.

In the shown exemplary embodiment, a control edge 20 is formed, seen in the axial direction of the piston 10, between the oil collection channel 17 and the ring belt 13, which with the axial direction includes an angle $\alpha$ (see FIG. 1). This control edge 20 can be formed circumferentially in the circumferential direction and circumferentially in the circumferential direction be configured with a constant angle $\alpha$. It is also possible to configure this control edge 20 with an angle $\alpha$ that is variable in the circumferential direction, which can be formed differently in the region of the pressure side, the pressure opposite side and in the region of the coupling side, the coupling opposite side. This is advantageous in order to individually influence the collecting of the oil and the dispensing of the oil.

The angle $\alpha$, which the control edge 20 includes with the axial direction, is preferentially greater than 0° and smaller than 90°, preferably, this angle lies between 45° and 90°, particularly preferably between 60° and 75°.

The oil, which during an upward stroke of the piston 10 flies or is splashed out of the oil collection channel 17 in the region of the pressure side and pressure opposite side in the direction of the cylinder liner, first reaches the control edge 20 (see FIG. 4) and flies or is splashed from the control edge 20 in the direction of the cylinder liner 11.

Figure 7:
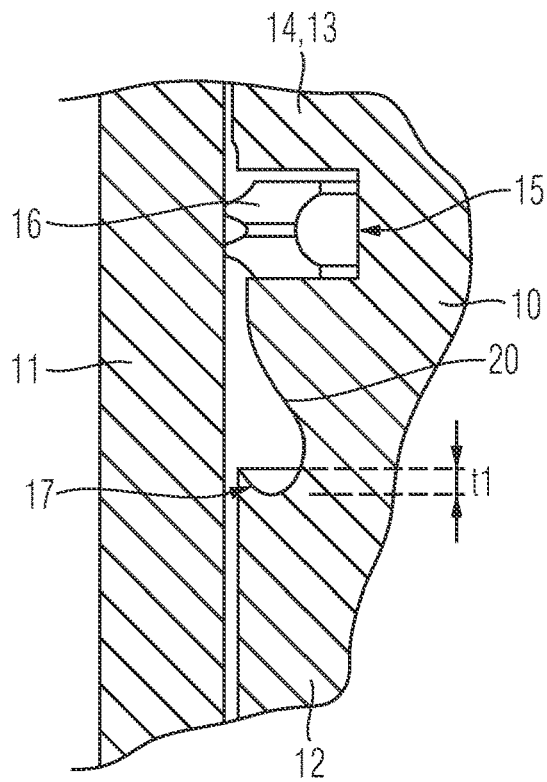
FIG. 7 a cross section by way of an extract through a piston according to an aspect of the invention in a sectional direction extending through the coupling side and the coupling opposite side with a monobloc embodiment of the piston.
Figure 8:
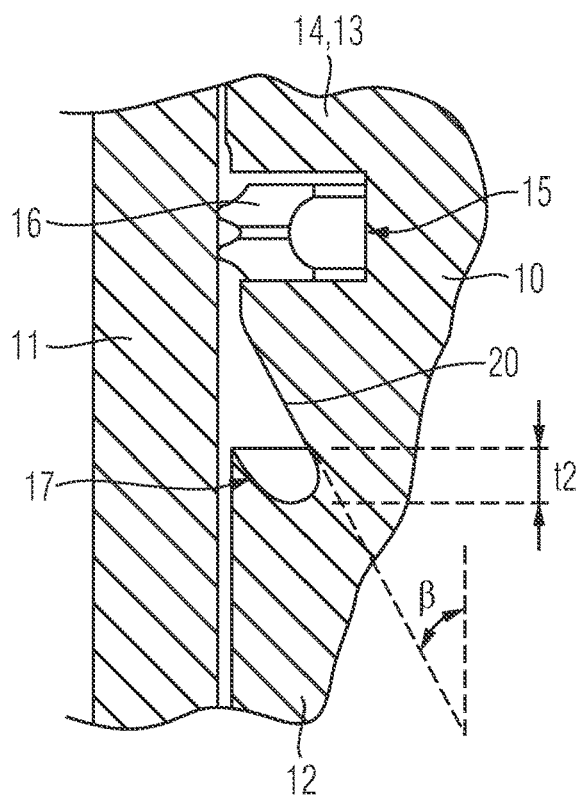
FIG. 8 a cross section by way of an extract through the piston according to FIG. 7 in a sectional direction extending through the pressure side and the pressure opposite side.

FIGS. 7 and 8 show cross sections through a piston 10 according to a second exemplary embodiment of the invention, which substantially differs from the piston 10 of the exemplary embodiment of FIGS. 1 to 6 only in that the piston 10 of FIGS. 7 and 8 is not formed as a built piston consisting of two assembled assemblies 10a, 10b joined to one another, but is rather embodied as a monobloc piston, the ring belt 13 and piston skirt 12 of which are formed by a monolithic assembly. With regard to the design embodiment details, reference for the piston 10 of FIGS. 7 and 8 can be made to the explanations regarding the piston 10 of FIGS. 1 to 6, wherein in the case of a monobloc piston the angle $\beta$, which the control edge 20 includes with the axial direction, is likewise greater than 0° and smaller than 90° and preferably amounts to between 30° and 70°.

With the invention present here, the lubrication of the piston 10 for the cylinder liner 11 can be improved, in particular in the region subjected to thermal and mechanical load shortly before and after the top dead center on the pressure side and pressure opposite side of the piston 10. The risk of the piston seizing up can be prevented. Here, the configuration of the oil collection channel with different depths and the gradient is significant according to an aspect of the invention.

During the downward stroke, oil can be collected in the oil collection channel 17 in the region of coupling side and coupling opposite side, flow within the oil collection channel 17 based on the gradient in the direction of the pressure side and pressure opposite side, be collected there and during the upward stroke be directed to the lubricating region between piston 10 and cylinder liner 11. The oil collection behaviour and oil dispensing behaviour can be coordinated via the angle of the control edge 20.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A piston (10) of a cylinder of an internal combustion engine, the piston (10) comprising:
   a piston skirt (12);
   a ring belt (13) positioned on a first axial side of the piston skirt (12), the ring belt (13) comprising a plurality of ring grooves (15), the ring grooves (15) being limited by, and separated from one another by, ring lands (14), each of the ring grooves (15) being configured to receive a piston ring (16) formed as compression ring or as oil scraper ring; and
   an oil collection channel (17) positioned, as seen in the axial direction of the piston, between the piston skirt (12) and the ring belt (13),
   wherein:
   the oil collection channel (17), seen in a circumferential position of a pressure side of the piston and/or in the circumferential position of a pressure opposite side of the piston in the axial direction of the piston, has a greater depth than in the circumferential position of a coupling side of the piston and/or in the circumferential position of a coupling opposite side of the piston, and the oil collection channel (17), seen in the circumferential direction of the piston, has a gradient, the gradient emanating from an axial depth in a region of the coupling side and/or of the coupling opposite side in the direction of the axial depth in the region of the pressure side and/or of the pressure opposite side.

2. The piston according to claim 1, wherein, seen in the circumferential direction, the circumferential position of the pressure opposite side is located opposite the circumferential position of the pressure side by 180°.

3. The piston according to claim 2, wherein the circumferential position of the coupling opposite side is located opposite the circumferential position of the coupling side seen in the circumferential direction by 180°.

4. The piston according to claim 3, wherein, seen in the circumferential direction, the circumferential position of the coupling opposite side and the circumferential position of the coupling side, are offset by 90° relative to the circumferential position of the pressure opposite side and the circumferential position of the pressure side.

5. The piston according to claim 3, wherein
a first axial depth (t2) of the oil collection channel (17) in the circumferential position of the pressure side and in the circumferential position of the pressure opposite side is between 4 mm and 30 mm, or between 6 mm and 20 mm, and
a second axial depth (t1) of the oil collection channel (17) in the circumferential position of the coupling opposite side and in the circumferential position of the coupling side is between 2 mm and 15 mm, or between 3 mm and 10 mm.

6. The piston according to claim 5, wherein, seen in the radial direction, a width (b) of the oil collection channel (17) is between 2 mm and 25 mm, or between 5 mm and 20 mm.

7. The piston according to claim 6, wherein, seen in the axial direction of the piston, a control edge (20) is arranged between the oil collection channel (17) and the ring belt (13) facing the oil collection channel (17), which, with the axial direction, includes an angle ($\alpha$, $\beta$).

8. The piston according to claim 7, wherein the piston is a monobloc piston, and the ring belt and piston skirt are each a part of a monolithic assembly, and the angle ($\beta$) is between 30° and 70°.

9. The piston according to claim 7, wherein the piston is a built piston, and the ring belt (13) and piston skirt (12) comprise, respectively, a ring belt assembly (10a) and a piston skirt assembly (10b), the ring belt assembly (10a) and the piston skirt assembly (10b) being distinct from one another and joined to one another, and the angle ($\alpha$) is between 60° and 75°.

10. The piston according to claim 7, wherein the angle which the control edge (20) includes with the axial direction varies in the circumferential direction.

11. A cylinder of an internal combustion engine, comprising:
a cylinder liner (11); and
the piston (10) according to claim 1, the piston being configured to be moveably guidable up and down in the cylinder liner (11).

* * * * *